United States Patent
Pan et al.

(10) Patent No.: US 12,556,718 B2
(45) Date of Patent: Feb. 17, 2026

(54) ELECTRONIC DEVICE AND METHOD WITH IMAGE ENCODING AND DECODING

(71) Applicant: Samsung Electronics Co., Ltd., Suwon-si (KR)

(72) Inventors: Rong Pan, Xi'an (CN); Pei You, Xi'an (CN); Ge Gao, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 18/532,232

(22) Filed: Dec. 7, 2023

(65) Prior Publication Data

US 2024/0223785 A1    Jul. 4, 2024

(30) Foreign Application Priority Data

Dec. 29, 2022 (CN) .......................... 202211712053.7
Sep. 19, 2023 (KR) .......................... 10-2023-0124820

(51) Int. Cl.
*H04N 19/176* (2014.01)
*H04N 19/50* (2014.01)

(52) U.S. Cl.
CPC ........... *H04N 19/176* (2014.11); *H04N 19/50* (2014.11)

(58) Field of Classification Search
None
See application file for complete search history.

(56) References Cited

U.S. PATENT DOCUMENTS

| | | | |
|---|---|---|---|
| 10,496,903 B2 | 12/2019 | Danielsson et al. | |
| 2020/0236349 A1* | 7/2020 | Zhai | H04N 19/61 |
| 2020/0351509 A1* | 11/2020 | Lee | G06N 3/088 |
| 2020/0387782 A1* | 12/2020 | Hegde | G06N 3/082 |
| 2020/0394523 A1* | 12/2020 | Liu | G06F 17/18 |
| 2021/0021823 A1* | 1/2021 | Na | G06N 3/08 |
| 2021/0273707 A1* | 9/2021 | Yoo | H04L 1/0041 |
| 2021/0407146 A1 | 12/2021 | Jiang et al. | |
| 2022/0101564 A1 | 3/2022 | Patel et al. | |
| 2022/0103845 A1* | 3/2022 | Wang | H04N 19/436 |
| 2022/0141456 A1* | 5/2022 | Galpin | G06N 3/08 |
| | | | 375/240.02 |

(Continued)

FOREIGN PATENT DOCUMENTS

| | | |
|---|---|---|
| CN | 107481295 A | 12/2017 |
| CN | 109474824 B | 4/2020 |

(Continued)

OTHER PUBLICATIONS

Ballé et al. "Variational image compression with a scale hyperprior" *arXiv preprint arXiv:1802.01436* May 1, 2018 (pp. 1-23).

(Continued)

*Primary Examiner* — Jared Walker
(74) *Attorney, Agent, or Firm* — NSIP Law

(57) ABSTRACT

A processor-implemented method includes determining weights of a plurality of channel blocks comprised in a neural network to encode an image, selecting one or more channel blocks from the plurality of channel blocks to encode the image based on the weights and a compression rate of the image, and generating an encoded image by encoding the image using a sub-neural network comprising channels comprised in the one or more channel blocks.

20 Claims, 6 Drawing Sheets

(56) References Cited

U.S. PATENT DOCUMENTS

| | | | | |
|---|---|---|---|---|
| 2022/0141471 A1* | 5/2022 | Hannuksela | ........... | G06N 3/084 |
| | | | | 375/240.02 |
| 2022/0224926 A1* | 7/2022 | Lu | ........................ | G06N 3/082 |
| 2022/0321143 A1* | 10/2022 | Kulkarni | ................ | G06N 3/063 |
| 2022/0368356 A1* | 11/2022 | Luo | ...................... | H03M 13/37 |
| 2022/0368918 A1* | 11/2022 | Ding | ................... | H04N 19/147 |
| 2022/0385907 A1* | 12/2022 | Zhang | ................... | H04N 19/91 |

FOREIGN PATENT DOCUMENTS

| | | |
|---|---|---|
| CN | 111754592 A | 10/2020 |
| CN | 113411583 A | 9/2021 |

OTHER PUBLICATIONS

Yang et al. "Slimmable compressive autoencoders for practical neural image compression" *Proceedings of the IEEE/CVF Conference on Computer Vision and Pattern Recognition.* 2021 (pp. 1-10).
Han et al. "Dynamic neural networks: A survey" *IEEE Transactions on Pattern Analysis and Machine Intelligence*, vol. 44 No. 11. Dec. 2, 2021 (pp. 1-20).

* cited by examiner

ELECTRONIC DEVICE AND METHOD WITH IMAGE ENCODING AND DECODING

CROSS-REFERENCE TO RELATED APPLICATIONS

This application claims the benefit under 35 USC § 119(a) of Chinese Patent Application No. 202211712053.7 filed on Dec. 29, 2022, in the China National Intellectual Property Administration, and Korean Patent Application No. 10-2023-0124820, filed on Sep. 19, 2023, in the Korean Intellectual Property Office, the entire disclosures of which are incorporated herein by reference for all purposes.

BACKGROUND

1. Field

The following description relates to an electronic device and method with image encoding and decoding.

2. Description of Related Art

A large number of pixels included in an image captured by a capturing apparatus, such as a camera, may greatly burden image processing (e.g., image storage and transmission). Accordingly, a method of encoding an image and then decoding the image may be used to conveniently store and transmit the image.

An image compression method based on a neural network may extract an image feature and perform image reconstruction by designing an end-to-end deep neural network (e.g., a variational autoencoder).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: determining weights of a plurality of channel blocks comprised in a neural network to encode an image; selecting one or more channel blocks from the plurality of channel blocks to encode the image based on the weights and a compression rate of the image; and generating an encoded image by encoding the image using a sub-neural network comprising channels comprised in the one or more channel blocks.

The determining of the weights of the plurality of channel blocks comprised in the neural network may include determining weights of the plurality of channel blocks by inputting the image to a channel block prediction network trained to determine the weights from the image.

Output channels of a last layer comprised in the channel block prediction network may respectively correspond to the plurality of channel blocks comprised in the neural network.

The selecting of the one or more channel blocks from the plurality of channel blocks may include: determining a number of the one or more channel blocks based on the compression rate; and selecting the one or more channel blocks from the plurality of channel blocks as much as the number, based on the weights.

The determining of the number of the one or more channel blocks based on the compression rate may include determining the number using a number of channels corresponding to the compression rate and a number of channels comprised in the plurality of channel blocks.

The selecting of the one or more channel blocks as much as the number may include selecting from the plurality of channel blocks as much as the number in order of highest corresponding weight.

The generating of the encoded image may include: extracting feature information of the image through the sub-neural network; and generating the encoded image by encoding the feature information.

The extracting of the feature information of the image may include: extracting a latent variable of the image from the image; extracting side information on the image based on the latent variable; and determining a Gaussian distribution parameter value of the latent variable based on the side information.

The generating of the encoded image may include: determining encoded side information by encoding the side information; determining an encoded latent variable by encoding the latent variable based on the Gaussian distribution parameter value; and generating the encoded image comprising the encoded side information and the encoded latent variable.

The method may include adding information indicating the one or more channel blocks to the encoded image to decode the encoded image.

In one or more general aspects, a non-transitory computer-readable storage medium stores instructions that, when executed by a processor, configure the processor to perform any one, any combination, or all of operations and/or methods described herein.

In one or more general aspects, a processor-implemented method includes: obtaining an encoded image and information indicating one or more channel blocks; selecting the one or more channel blocks from a plurality channel blocks of a neural network configured to decode the encoded image based on the information indicating the one or more channel blocks; and generating a reconstructed image by decoding the image using a sub-neural network comprising channels comprised in the one or more channel blocks.

The encoded image may include encoded side information obtained by encoding side information extracted based on an encoded latent variable and side information extracted based on the latent variable wherein the encoded latent variable is obtained by encoding a latent variable extracted from the image.

In one or more general aspects, an electronic device includes: one or more processors configured to: determine weights of a plurality of channel blocks comprised in a neural network to encode an image; select one or more channel blocks from the plurality of channel blocks to encode the image based on the weight and a compression rate of the image; and generate an encoded image by encoding the image using a sub-neural network comprising channels comprised in the one or more channel blocks.

For the generating of the encoded image, the one or more processors may be configured to: extract feature information of the image through the sub-neural network; and generate the encoded image by encoding the feature information.

The one or more processors may be configured to: extract a latent variable for the image, extract side information on the image based on the latent variable; and determine a Gaussian distribution parameter value of the latent variable based on the side information.

The one or more processors may be configured to: determine encoded side information by encoding the side information; determine an encoded latent variable by encoding the latent variable based on the Gaussian distribution parameter value; and generate the encoded image comprising the encoded side information and the encoded latent variable.

The one or more processors may be configured to add information indicating the one or more channel blocks to the encoded image to decode the encoded image.

In one or more general aspects, an electronic device includes: one or more processors configured to: obtain an encoded image and information indicating one or more channel blocks; select the one or more channel blocks from a plurality channel blocks of a neural network configured to decode the encoded image based on the information indicating the one or more channel blocks; and generate a reconstructed image by decoding the image using a subneural network comprising channels comprised in the one or more channel blocks.

The encoded image may include encoded side information obtained by encoding side information extracted based on an encoded latent variable and side information extracted based on the latent variable wherein the encoded latent variable is obtained by encoding a latent variable extracted from the image.

Other features and aspects will be apparent from the following detailed description, the drawings, and the claims.

Figure 1:
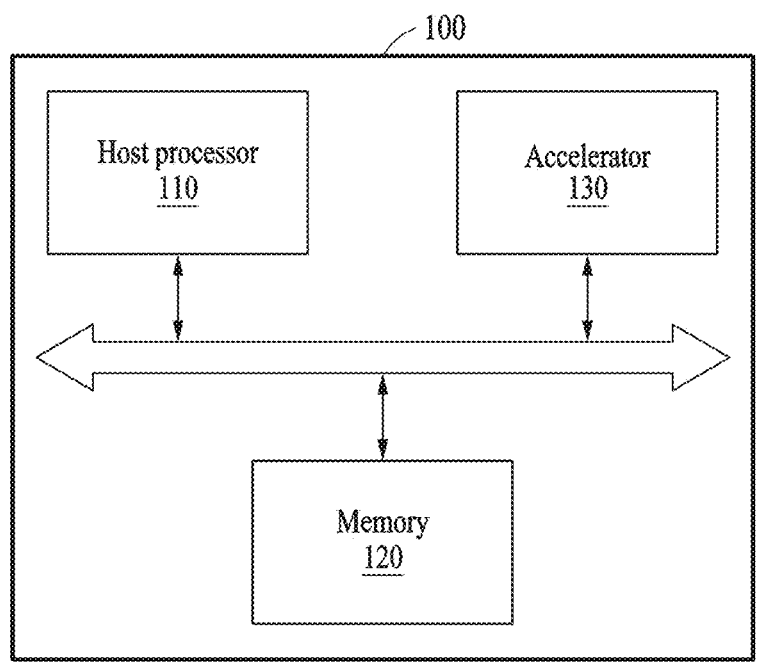
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

The phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an electronic device.

Referring to FIG. 1, an electronic device 100 may include a host processor 110 (e.g., one or more processors), a memory 120 (e.g., one or more memories), and an accelerator 130. The host processor 110, the memory 120, and the accelerator 130 may communicate with each other through a bus, a network on a chip (NoC), a peripheral component interconnect express (PCIe), and the like. In the example of FIG. 1, only components related to embodiments described herein are illustrated in the electronic device 100. Thus, the electronic device 100 may also include other general-purpose components, in addition to the components illustrated in FIG. 1.

The host processor 110 may perform overall functions for controlling the electronic device 100. The host processor 110 may control the electronic device 100 overall by executing programs and/or instructions stored in the memory 120. For example, the memory 120 may be or include a non-transitory computer-readable storage medium storing instructions that, when executed by the host processor 110, configure the host processor 110 to perform any one, any combination, or all of operations and methods of the host processor 110 disclosed herein. The host processor 110 may be implemented as a central processing unit (CPU), a graphics processing unit (GPU), an application processor (AP), and the like, which are included in the electronic device 100, however, examples are not limited thereto.

The memory 120 may be hardware for storing data processed in the electronic device 100 and data to be processed. In addition, the memory 120 may store an application, a driver, and the like to be driven by the electronic device 100. The memory 120 may include a volatile memory (e.g., dynamic random-access memory (DRAM)) and/or a non-volatile memory.

The electronic device 100 may include the accelerator 130 for an operation. The accelerator 130 may process tasks that may be more efficiently processed by a separate exclusive processor (that is, the accelerator 130), rather than by the general-purpose host processor 110, due to the characteristics of the tasks. Here, one or more processing elements (PEs) included in the accelerator 130 may be utilized. The accelerator 130 may correspond to, for example, a neural processing unit (NPU), a tensor processing unit (TPU), a digital signal processor (DSP), a GPU, a neural engine, and the like that may perform an operation according to a neural network.

An operating method of a processor (e.g., the host processor 110 and/or the accelerator 130) described hereinafter may be performed by the host processor 110 and/or the accelerator 130.

When encoding an image, the processor may extract a latent variable from an input image through a feature extraction network. The processor may obtain a Gaussian distribution parameter value of the latent variable based on the latent variable through a super-priority model. The processor may encode a quantized latent variable to a bitstream file, e.g., a compressed image, based on the Gaussian entropy encoding. When decoding, the processor may first obtain a latent variable by performing Gaussian entropy decoding on the bitstream file. The processor may obtain a reconstructed image through a reconstruction network based on the latent variable.

The depth and width of the neural network may increase to enhance the quality of the reconstructed image. However, increasing the depth and width of the neural network may lead to a problem, such as the neural network model having high computational complexity. The neural network may be lightened through a method, such as quantization and pruning. The computational amount of image encoding or decoding may effectively decrease in a lightweight neural network, however, the performance may be affected.

A deep learning-based encoding network may have a fixed number of network parameters and computational complexity. Accordingly, various neural networks may be trained to adapt to various compression rates. For example, different neural networks may be used to compress an image in different sizes.

A deep learning-based multi-encoding rate image compression network may achieve a multi-compression rate through parameter cutting. In this case, neural networks with different compression rates may share a parameter; however, this may restrict the accuracy of other sub-neural networks. In addition, when different input images are processed using the same subnetwork model, a difference between different input images may be ignored.

A dynamic network based on channel selection may predict a weight of each channel through a prediction network. However, when the number of channels is relatively great, the number of subnetworks predicted during a training process may be extremely great and thus, it may not help convergence of the entire network.

In contrast, a method of one or more embodiments of encoding or decoding an image by adaptively selecting an appropriate encoding or decoding sub-neural network from an encoding or decoding neural network is described to solve the problems described above. Hereinafter, an encoding or decoding method to perform image compression at different compression rates by adaptively selecting an encoding or decoding sub-neural network, decrease computational complexity, and enhance the quality of a reconstructed image is described.

Figure 2:
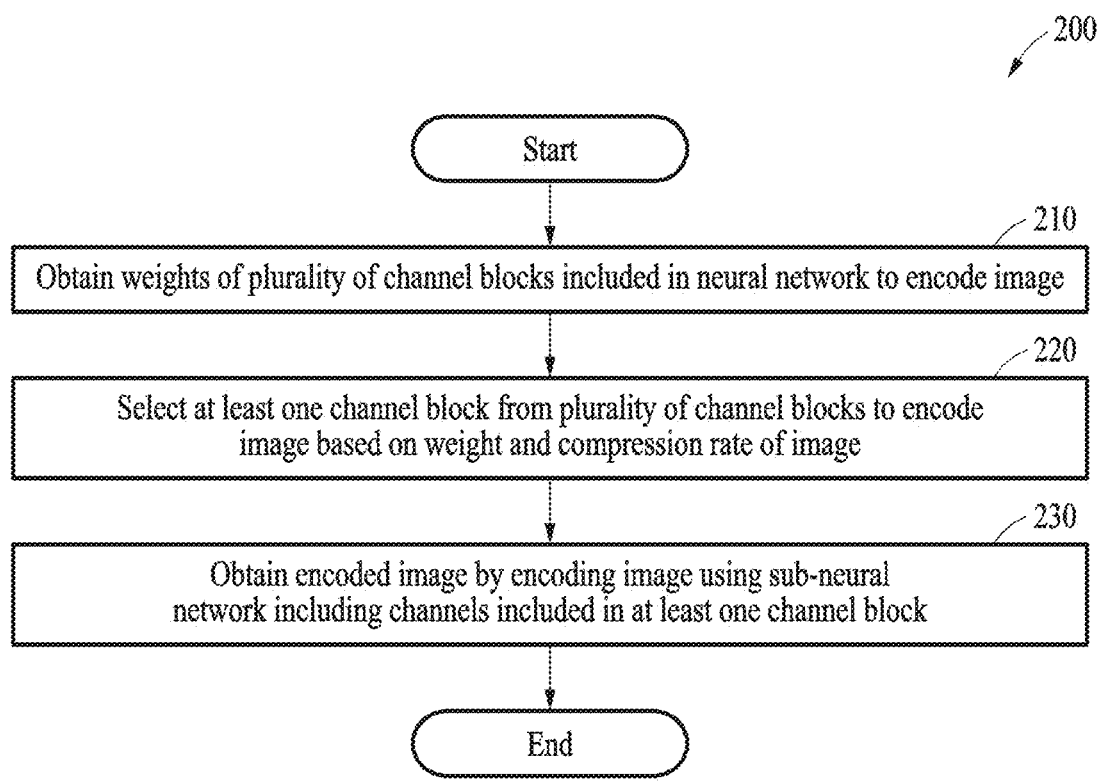
FIG. 2 illustrates an example of an operating method of an electronic device.

FIG. 2 illustrates an example of an operating method of an electronic device.

Operations to be described hereinafter may be sequentially performed but not necessarily. For example, the order of the operations may change, and at least two of the operations may be performed in parallel. Operations illustrated in a flowchart 200 may be performed by at least one component (e.g., the processor 110 of FIG. 1 and/or the accelerator 130 of FIG. 1) of an electronic device.

In operation 210, the electronic device may obtain weights of a plurality of channel blocks included in a neural network to encode an image.

The neural network may be a neural network trained to compress and encode an image. The neural network may include a plurality of channel blocks. Each of the plurality of channel blocks may include a predetermined number of channels. The channels included in each channel block may not overlap with each other.

For example, a maximum number of the channels included in the neural network may be N. N channels may be divided into an equal number to the n channel blocks. However, the method of segmenting channels into channel blocks described above is an example and the method of segmenting channels into channel blocks is not limited thereto. For example, the number of channels included in the channel blocks may vary. A subset of the plurality of channel blocks may be included in a sub-neural network including N or fewer channel blocks.

The processor may obtain (e.g., generate or determine) weights of the plurality of channels included in the neural network through a channel block prediction network.

According to an embodiment, the channel block prediction network may include a global average pooling layer and a first convolutional layer. The global average pooling layer and the first convolutional layer may be sequentially cascaded.

According to an embodiment, the channel block prediction network may include a first convolutional layer, a global average pooling layer, and a second convolutional layer. For example, the channel block prediction network may further include the second convolutional layer. The second convolutional layer, the global average pooling layer, and the first convolutional layer may be sequentially cascaded.

In the embodiments described above, the first convolutional layer may include a plurality of sub-convolution layers. In the plurality of sub-convolution layers, the number of output channels of a last sub-convolution layer may be the same as the number of plurality of channel blocks included in the neural network. The output channels of the last sub-convolution layer may correspond to the plurality of channel blocks included in the neural network. An output of the output channel of the last sub-convolution layer may be a weight for a corresponding channel block.

An example of the channel block prediction network is additionally described with reference to FIG. 3.

In operation 220, the electronic device may select at least one channel block from the plurality of channel blocks to encode an image based on a compression rate of the image and a weight among the obtained weights.

An example of the method of selecting at least one channel block from a plurality of channel blocks is described with reference to FIG. 4.

In operation 230, the electronic device may obtain an encoded image by encoding an image using the sub-neural network including channels included in the at least one channel block.

An example of the method of obtaining an encoded image is described with reference to FIG. 5.

Figure 3:
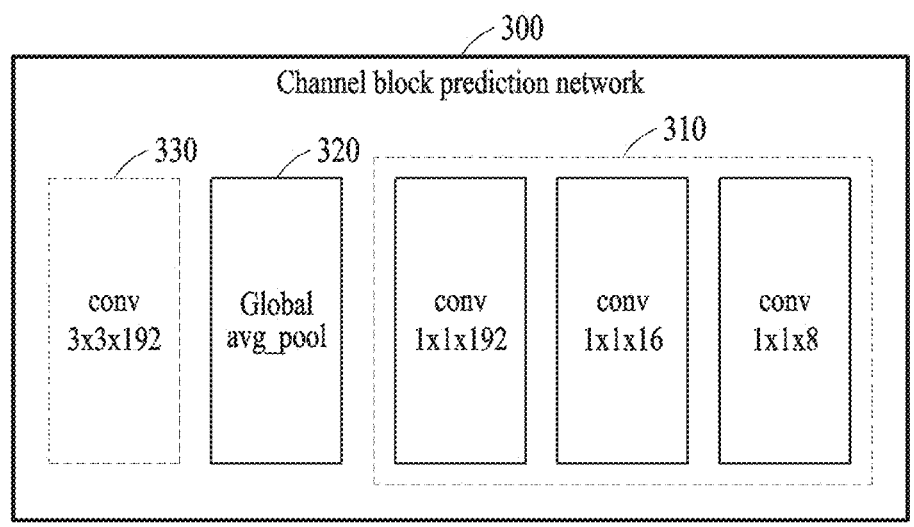
FIG. 3 illustrates an example of a channel block prediction network.

FIG. 3 illustrates an example of a channel block prediction network.

Referring to FIG. 3, a channel block prediction network 300 is illustrated.

The channel block prediction network 300 may include a global average pooling layer 320 and a first convolutional layer 310. The global average pooling layer 320 and the first convolutional layer 310 may be sequentially cascaded. The first convolutional layer 310 may include three convolutional layers, as a non-liming example. The three convolutional layers may have a kernel size of 1×1. The numbers of the kernels of the three convolutional layers may be 192, 16, and 8, respectively. For example, the number of output channels of the three convolutional layers may be 192, 16, and 8, respectively.

According to an embodiment, the channel block prediction network 300 may further include a second convolutional layer 330. The second convolutional layer 330 may have a kernel size of 3×3. The number of kernels of the second convolutional layer 330 may be 192.

The channel block prediction network 300 may receive an image as an input. The channel block prediction network 300 may extract a vector from the image. Elements included in the vector may correspond to a plurality of output channels included in a last convolutional layer of the channel block prediction network 300. Each element included in the vector may be an output generated by a corresponding one of the plurality of output channels. The number of elements included in the vector may be the same as the number of output channels of the last convolutional layer.

The elements included in the vector may correspond to the plurality of channel blocks. The number of elements included in the vector may be the same as the number of plurality of channel blocks included in the neural network. Each element included in the vector may be a weight of a corresponding channel block. Each weight may indicate the importance of a corresponding channel block of the plurality of channel blocks included in the neural network. A more important channel block may have a higher weight.

For example, the number of output channels of the last convolutional layer of the channel block prediction network 300 may be 8. An index of an output channel may start from 0 or 1, but the example is not limited thereto. Outputs of output channels 0 to 7 may respectively indicate weights of corresponding channel blocks 0 to 7.

However, the descriptions of the structure of the channel block prediction network 300, the output channel, and the index of the channel block provided above are examples and the present disclosure is not limited thereto.

Hereinafter, an example of a method of selecting a channel block in a neural network is described.

Figure 4:
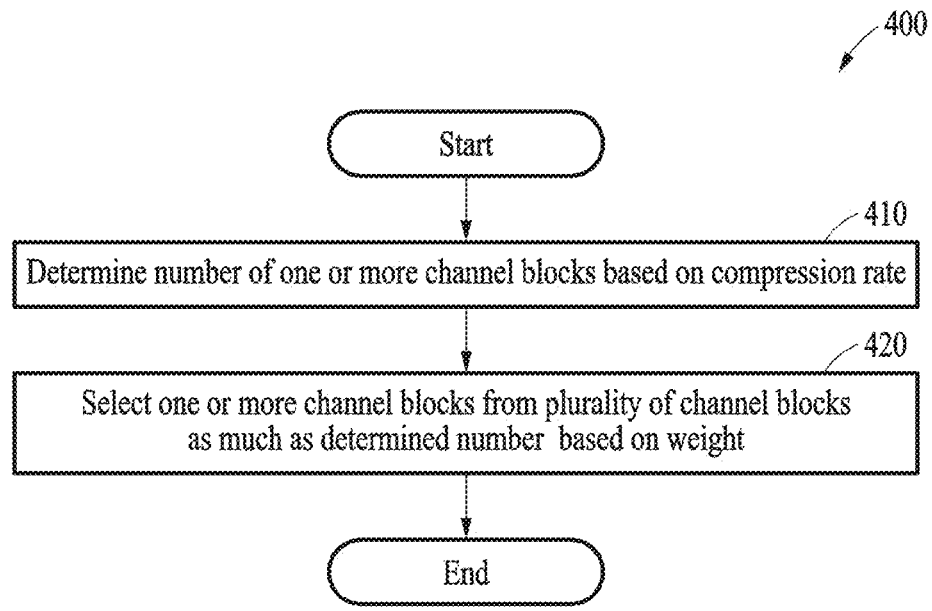
FIG. 4 is a flowchart illustrating an example of a method of selecting at least one channel block.

FIG. 4 is a flowchart illustrating an example of a method of selecting at least one channel block.

Operations to be described hereinafter may be sequentially performed but not necessarily. For example, the order of the operations may change, and at least two of the operations may be performed in parallel. Operations illustrated in a flowchart 400 may be performed by at least one component (e.g., the processor 110 of FIG. 1 and/or the accelerator 130 of FIG. 1) of an electronic device.

The electronic device may select at least one channel block from the plurality of channel blocks to encode an image based on a compression rate of the image and a weight.

For example, in operation 410, the electronic device may determine the number (e.g., the total quantity) of one or more channel blocks based on a compression rate of an image.

The number of channels to be used for (e.g., to be used to configure) a sub-neural network may be determined based on the compression rate of the image. For example, the numbers of channels corresponding to different compression rates may be 48, 72, 96, and 192 respectively. The electronic device may determine the number of corresponding channels based on the compression rate. The electronic device may determine the number of channel blocks to be used for the sub-neural network based on the number of channels included in a channel block. For example, when encoding an image at a predetermined compression rate, the number of channels corresponding to the predetermined compression rate may be 48. In this case, when each channel block included in the neural network includes 12 channels, a total of 4 channel blocks may be determined to be used for the sub-neural network. For example, the number of channel blocks to be used may be a value obtained by dividing the number of channels corresponding to the compression rate by the number of channels included in the channel block.

In operation 420, the electronic device may select one or more channel blocks as much as the determined number from the plurality of channel blocks based on the weight. For example, the electronic device may select a number of the plurality of channel blocks such that the selected number equals the determined number, based on the weight.

The electronic device may align weights of the plurality of channel blocks included in the neural network determined by the channel block prediction network in a forward direction. The electronic device may select one or more channel blocks as much as the number determined in operation 410 from the plurality of aligned channel blocks. The electronic device may select one or more channel blocks as much as the determined number starting from a channel block with the highest weight from the plurality of channel blocks. For example, the electronic device may select 4 channel blocks starting from a channel block with the highest weight from the plurality of channel blocks. For example, the electronic device may select 4 channel blocks having the highest weights from the plurality of channel blocks.

Hereinafter, an example of a method of encoding an image using selected channel blocks is described.

Figure 5:
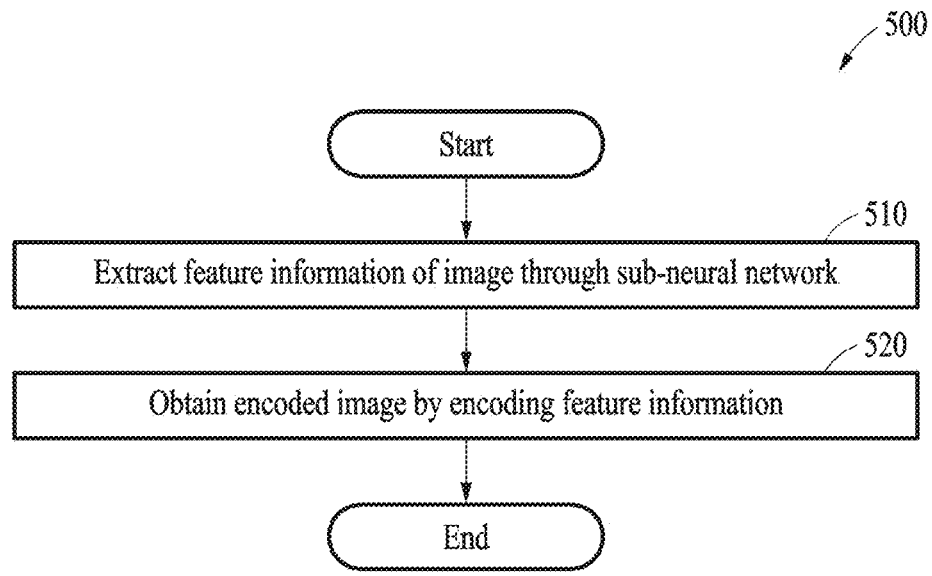
FIG. 5 is a flowchart illustrating an example of a method of obtaining an encoded image.

FIG. 5 is a flowchart illustrating an example of a method of obtaining an encoded image.

Operations to be described hereinafter may be sequentially performed but not necessarily. For example, the order of the operations may change, and at least two of the operations may be performed in parallel. Operations illustrated in a flowchart 500 may be performed by at least one component (e.g., the processor 110 of FIG. 1 and/or the accelerator 130 of FIG. 1) of an electronic device.

The electronic device may obtain an encoded image by encoding an image using the sub-neural network configured by channels included in one or more selected channel blocks. The one or more channel blocks may be channel blocks selected from a plurality of channel blocks included in a neural network using the method of FIG. 4.

For example, in operation 510, the electronic device may extract feature information of the image through the sub-neural network configured by channels included in one or more selected channel blocks.

A plurality of channels included in the at least one channel block may configure the sub-neural network. The operation of extracting feature information from an image may include an operation of extracting a latent variable for the image from the image. The operation of extracting feature information of an image may include an operation of extracting side information for the image based on the latent variable. The operation of extracting feature information of an image may include an operation of obtaining a Gaussian distribution parameter value of the latent variable based on the side information. An example of the method of extracting feature information of an image is described with reference to FIG. 6.

In operation 520, the electronic device may obtain an encoded image by encoding the feature information.

The electronic device may obtain encoded side information by encoding the side information. The electronic device may obtain an encoded latent variable by encoding the latent variable based on the Gaussian distribution parameter value. The electronic device may include an operation of generating an encoded image including encoded side information and an encoded latent variable. An example of the method of obtaining an encoded image is described with reference to FIG. 6.

Figure 6:
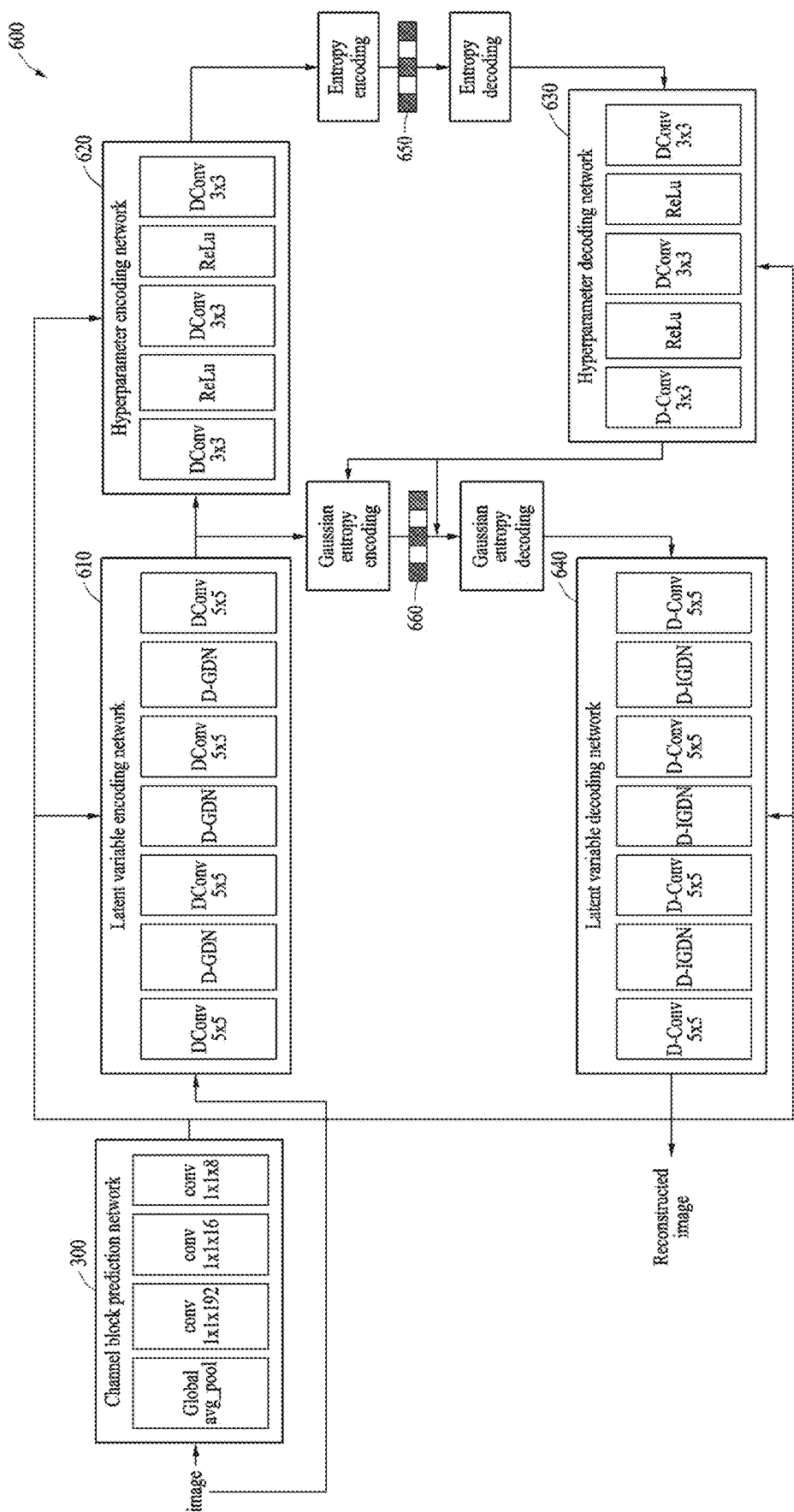
FIG. 6 illustrates an example of an encoding process and a decoding process.

FIG. 6 illustrates an example of an encoding process and a decoding process.

Referring to FIG. 6, a block diagram 600 showing an encoding process and a decoding process is illustrated. An electronic device may determine one or more channel blocks for encoding an image based on a weight of a channel block determined by the channel block prediction network 300. The sub-neural network configured by the one or more determined channel blocks may perform encoding.

Referring to FIG. 6, the neural network may include a latent variable encoding network 610, a hyperparameter encoding network 620, a hyperparameter decoding network 630, and a latent variable decoding network 640. The sub-neural network for encoding may include the latent variable encoding network 610 and the hyperparameter encoding network 620. The sub-neural network for decoding may include the hyperparameter decoding network 630 and the latent variable decoding network 640.

The latent variable encoding network 610 may include 4 dynamic convolutional layers (hereinafter, referred to as DConv layers) and three dynamic generalized division normalization (D-GDN) layers. The DConv layer may generate a new convolution kernel parameter by collecting a convolution kernel parameter of a corresponding channel among convolution kernel parameters based on a channel index. The DConv layer may perform a convolution task using the new convolution kernel parameter. The D-GDN layer may normalize an input vector based on the number of channels of the input vector. The D-GDN layer may normalize the input vector based on Equation 1 shown below, for example.

$$y = \frac{x}{\sqrt{(\beta \times \beta\_\text{scale} + \beta\_\text{bias}) + \sum{((\gamma \times \gamma\_\text{scale} + \gamma\_\text{bias}) \times x^2)}}} \quad \text{Equation 1}$$

In Equation 1, x may denote an input vector, y may denote an output vector, β, and γ may denote parameters to be trained. β_scale and β_bias may be coefficients related to β. γ_scale and γ_bias may be coefficients related to γ. The parameters and coefficients described above may be parameters and coefficients to be trained.

An input channel index of a first DConv layer of the latent variable encoding network 610 may be [0, 1, 2]. This may represent that three channels exist in an input. An output channel index of the first DConv layer may be a prediction result of the channel block prediction network 300. Input channel indexes and output channel indexes of the remaining three DConv layers may be results predicted through the channel block prediction network 300. The latent variable encoding network 610 may receive an image as an input and may output a latent variable of the image through the 4 DConv layers and three D-GDN layers. For example, channel blocks (or a channel block index) may be determined and channels (or a channel index) corresponding to the determined channel blocks may be determined. latent variables of the image may be extracted through a subnetwork configured by channels corresponding to a channel index.

The hyperparameter encoding network 620 may include three DConv layers and two rectified linear unit (ReLu) activation layers. The latent variable may obtain side information to be encoded through the hyperparameter encoding network 620. In addition, the electronic device may obtain a bitstream file 650 (that is, encoded side information) of the side information by entropy encoding the side information.

The hyperparameter decoding network 630 may include three dynamic deconvolution layers (hereinafter, referred to as D-Conv layers) and two ReLu activation layers. The side information may be input to the hyperparameter decoding network 650 to obtain a Gaussian distribution parameter value of the latent variable. For example, the side information may be obtained by entropy decoding the bitstream file 650 of the side information and the Gaussian distribution parameter value of the latent variable may be obtained by inputting the side information to the hyperparameter decoding network 630.

The electronic device may Gaussian entropy encode the latent variable based on the Gaussian distribution parameter value obtained by the hyperparameter decoding network 630. The electronic device may obtain a bitstream file 660 of the latent variable through Gaussian entropy encoding. As the bitstream file 660 (that is, an encoded latent variable) of the latent variable is obtained, encoding of the image may be completed. The encoded image may include an encoded latent variable and encoded side information.

According to an embodiment, to decode an encoded image, the electronic device may add information indicating one or more channel blocks to the encoded image. The electronic device may add, to the encoded image, information indicating one or more channel blocks selected from the plurality of channel blocks.

Hereinafter, an example of a method of decoding an encoded image is described.

Figure 7:
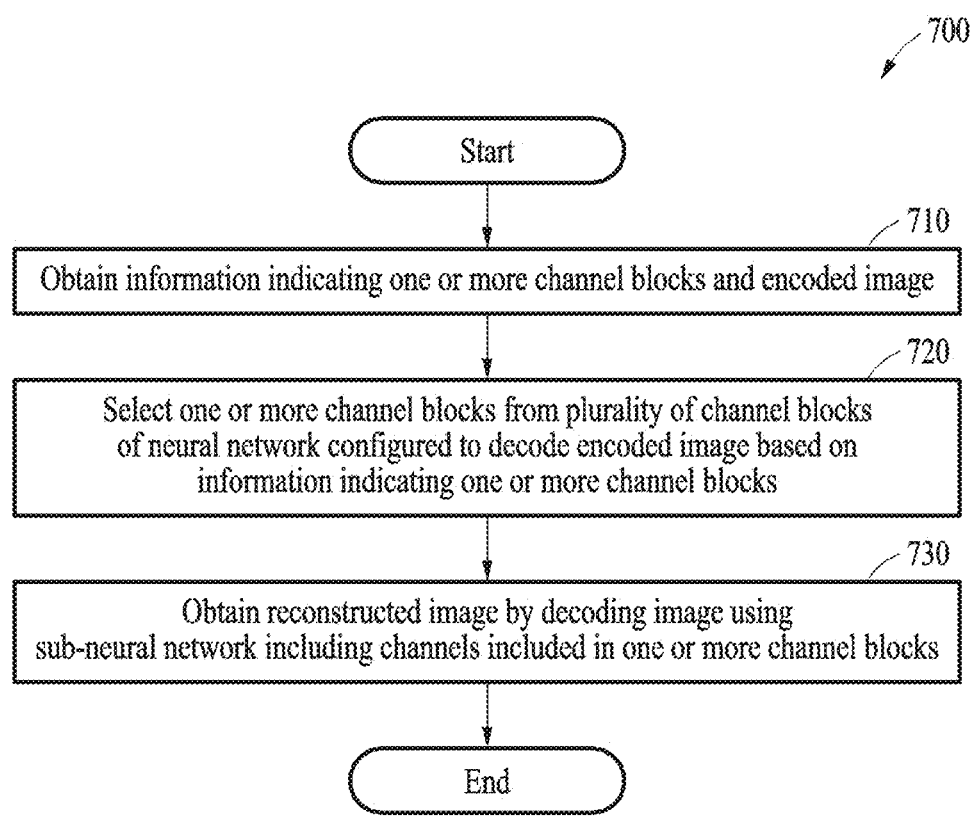
FIG. 7 is a flowchart illustrating an example of a method of decoding an encoded image.

FIG. 7 is a flowchart illustrating an example of a method of decoding an encoded image.

Operations to be described hereinafter may be sequentially performed but not necessarily. For example, the order of the operations may change, and at least two of the operations may be performed in parallel. Operations illustrated in a flowchart 700 may be performed by at least one component (e.g., the processor 110 of FIG. 1 and/or the accelerator 130 of FIG. 1) of an electronic device.

In operation 710, an electronic device may obtain information indicating one or more channel blocks and an encoded image.

Since the method of obtaining information indicating one or more channel blocks is described in the method of encoding an image, the description thereof is omitted.

In operation 720, the electronic device may select one or more channel blocks from a plurality of channel blocks of a neural network configured to decode an encoded image based on the information indicating one or more channel blocks.

The neural network may be a neural network trained to decode an encoded image. The electronic device may determine one or more channel blocks in the neural network trained to decode an encoded image based on information indicating one or more channel blocks. For example, the electronic device may obtain a channel block index based on a result of selecting the one or more channel blocks from the plurality of channel blocks obtained during encoding. The electronic device may select channel blocks corresponding to the selected channel blocks in the neural network trained to encode an image from the trained neural network.

In operation 730, a reconstructed image may be obtained by decoding the image using a sub-neural network including channels included in the one or more channel blocks.

Referring to FIG. 6, a decoding network may include the latent variable decoding neural 640 and the hyperparameter decoding network 630. The latent variable decoding network 640 may include 4 D-Conv layers and three dynamic anti-GDN (D-iGDN) layers. Input channel indexes and output channel indexes of the first three D-Conv layers may be prediction results of the channel block prediction network 300. An input channel index of the last D-Conv layer may be a prediction result of the channel block prediction network 300. An output channel index of the last D-Conv layer may be [0, 1, 2]. The electronic device may obtain side information by entropy decoding the bitstream file 650 of the side information. The electronic device may obtain a Gaussian distribution parameter value by inputting the side information to the hyperparameter decoding network 630. The electronic device may Gaussian entropy decode the bitstream file 660 of the latent variable based on the Gaussian distribution parameter value. The electronic device may obtain a latent variable extracted from the image through Gaussian entropy decoding. The electronic device may obtain a reconstructed image by inputting the latent variable to the latent variable decoding network 640.

According to one or more embodiments of the present disclosure, when a maximum number of channels is determined, different sub-neural networks may be formed by setting multiple fixed channel numbers in order from great to small in advance to correspond to uncompressed ratios from great to small. Accordingly, a single neural network model may be used to encode an image at different compression rates. On the other hand, the number of parameters with respect to the entire network may not increase due to weight sharing among sub-neural networks or between sub-neural networks and the entire neural network. In addition, since the computational complexity of the sub-network may decrease compared to the entire model, optimization of computational complexity may be achieved and encoding and decoding time for a small bit-rate may decrease.

One of ordinary skill in the technical field may understand that the channel block prediction network, the encoding network, and the decoding network may be comprehensively end-to-end trained. For example, a difference between the reconstructed image and an original image may be minimized through training.

To improve training speed, a mean value of predicted values in batch for the channel block prediction network may be used as an output of the channel block prediction network at an early stage of training. After the entire network is converged, different channel block prediction values may be used in a single batch to fine-tune the entire network.

As described above, in an inference step, an output of the channel block prediction network may be used as a weight of a channel block. For example, in a training step, an output vector tensor of the channel block prediction network may be processed as a weight of a channel block through a Gumbel_softmax function.

A process of the Gumbel_softmax function may be as follows: Firstly, two Gumbel noises g1 and g2 may be generated depending on the shape of a tensor. An equation to generate the Gumbel noises g1 and g2 may be Equation 2 below, for example.

$$U_1 = \text{random\_uniform(shape(tensor))}$$
$$U_2 = \text{random\_uniform(shape(tensor))}$$
$$g_1 = -\log(-\log(U_1 + eps) + eps)$$
$$g_2 = -\log(-\log(U_2 + eps) + eps),$$

Equation 2

The Gumbel noises g1 and g2 may be superimposed on a vector tensor and a weight soft of a channel block may be obtained through softmax noise. In this case, the tensor and the weight soft may be the same as in Equation 3 below, for example.

$$\text{tensor} = \text{tensor} + g_1 - g_2 \quad \text{Equation 3}$$

$$\text{soft} = \text{softmax}(\text{tensor}/\text{gumbel\_temp})$$

eps and gumbel_temp may be preset values. Equation 4 below, for example, which is a loss function, may be used for training.

$$L = \sum_{k=1}^{K}(\Lambda_k \times D_k + R_k) \quad \text{Equation 4}$$

K may represent an index of a compression rate. $D_k$ may represent a mean squared error (MSE) loss function of all subnetworks corresponding to a k-th compression rate. $R_k$ may represent an encoding rate loss function of all subnetworks corresponding to the k-th compression rate. $\Lambda_k$ may be a preset coefficient corresponding to the k-th compression rate. MSE may be a mean square of pixel differences between an uncompressed image and an original image.

One of ordinary skill in the technical field may understand that a channel of channel blocks refers to a channel from an end of the entire encoding and decoding network to a segment. One of ordinary skill in the art may understand that a channel of channel blocks also refers to a channel of an encoding portion or a decoding portion of the entire encoding and decoding network. That is, when a channel used for encoding is determined based on a prediction result of the channel block prediction network, a corresponding channel used for decoding may also be determined. In addition, the hyperparameter encoding network at an encoding step may be the same as the hyperparameter decoding network at a decoding step.

The electronic devices, host processors, memories, accelerators, electronic device 100, host processor 110, memory 120, accelerator 130, and other apparatuses, devices, units, modules, and components disclosed and described herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:
    determining weights of a plurality of channel blocks comprised in a neural network, each of the plurality of channel blocks includes a predetermined number of channels;
    selecting one or more channel blocks from the plurality of channel blocks based on the weights and a compression rate of an image; and
    generating an encoded image by encoding the image using a sub-neural network comprising channels comprised in the selected one or more channel blocks.

2. The method of claim 1, wherein the determining of the weights of the plurality of channel blocks comprised in the neural network comprises inputting the image to a previously trained channel block prediction network, and
    wherein the generating the encoded image by encoding the image is implemented using only the selected one or more channel blocks of the plurality of channel blocks.

3. The method of claim 2, wherein output channels of a last layer comprised in the channel block prediction network respectively correspond to the plurality of channel blocks comprised in the neural network.

4. The method of claim 1, wherein the selecting of the one or more channel blocks from the plurality of channel blocks comprises:
    determining a number of the one or more channel blocks based on the compression rate; and
    selecting the one or more channel blocks from the plurality of channel blocks as much as the number, based on the weights.

5. The method of claim 4, wherein the determining of the number of the one or more channel blocks based on the compression rate comprises determining the number using a number of channels corresponding to the compression rate and a number of channels comprised in the plurality of channel blocks.

6. The method of claim 4, wherein the selecting of the one or more channel blocks as much as the number comprises selecting from the plurality of channel blocks as much as the number in order of highest corresponding weight.

7. The method of claim 1, wherein the generating of the encoded image comprises:
    extracting feature information of the image through the sub-neural network; and
    generating the encoded image by encoding the feature information.

8. The method of claim 7, wherein the extracting of the feature information of the image comprises:
    extracting a latent variable of the image from the image;
    extracting side information on the image based on the latent variable; and
    determining a Gaussian distribution parameter value of the latent variable based on the side information.

9. The method of claim 8, wherein the generating of the encoded image comprises:
    determining encoded side information by encoding the side information;
    determining an encoded latent variable by encoding the latent variable based on the Gaussian distribution parameter value; and
    generating the encoded image comprising the encoded side information and the encoded latent variable.

10. The method of claim 1, further comprising adding information indicating the one or more channel blocks to the encoded image to decode the encoded image.

11. A non-transitory computer-readable storage medium storing instructions that, when executed by the one or more processors, cause the one or more processors to perform the method of claim 1.

12. A processor-implemented method, the method comprising:
    selecting one or more channel blocks from a plurality channel blocks of a neural network based on information indicating one or more channel blocks, each of the plurality of channel blocks includes a predetermined number of channels; and generating a reconstructed image by decoding an encoded image using a sub-neural network comprising channels comprised in the selected one or more channel blocks.

13. The method of claim 12, wherein the encoded image comprises encoded side information obtained by encoding side information extracted based on an encoded latent variable and side information extracted based on the latent variable wherein the encoded latent variable is obtained by encoding a latent variable extracted from the image.

14. An electronic device comprising:
one or more processors;
a memory comprising one or more non-transitory storage media that store instructions that, when executed by the one or more processors, configures the electronic device to:
determine weights of a plurality of channel blocks comprised in a neural network, each of the plurality of channel blocks includes a predetermined number of channels;
select one or more channel blocks from the plurality of channel blocks based on the weight and a compression rate of an image; and
generate an encoded image by encoding the image using a sub-neural network comprising channels comprised in the selected one or more channel blocks.

15. The electronic device of claim 14, wherein, for the generating of the encoded image, the execution of the instructions further configures the electronic device to:
extract feature information of the image through the sub-neural network using only the selected one or more channel blocks of the plurality of channel blocks; and
generate the encoded image by encoding the feature information.

16. The electronic device of claim 15, wherein the execution of the instructions further configures the electronic device to:
extract a latent variable for the image, extract side information on the image based on the latent variable; and
determine a Gaussian distribution parameter value of the latent variable based on the side information.

17. The electronic device of claim 16, wherein the execution of the instructions further configures the electronic device to:
determine encoded side information by encoding the side information;
determine an encoded latent variable by encoding the latent variable based on the Gaussian distribution parameter value; and
generate the encoded image comprising the encoded side information and the encoded latent variable.

18. The electronic device of claim 14, wherein the execution of the instructions further configures the electronic device to add information indicating the one or more channel blocks to the encoded image to decode the encoded image.

19. An electronic device comprising:
one or more processors; and
a memory comprising one or more non-transitory storage media that store instructions that, when executed by the one or more processors, configures the electronic device to:
select one or more channel blocks from a plurality channel blocks of a neural network based on information indicating the one or more channel blocks, each of the plurality of channel blocks includes a predetermined number of channels; and
generate a reconstructed image by decoding an encoded image using a sub-neural network comprising channels comprised in the selected one or more channel blocks.

20. The electronic device of claim 19, wherein the encoded image comprises encoded side information obtained by encoding side information extracted based on an encoded latent variable and side information extracted based on the latent variable, and
wherein the encoded latent variable is obtained by encoding a latent variable extracted from the image.

* * * * *